United States Patent

[11] 3,601,641

[72] Inventor Max Baermann
 506 Bensberg, Berzik Cologne, Portugal
[21] Appl. No. 5,889
[22] Filed Jan. 26, 1970
[45] Patented Aug. 24, 1971
[32] Priority Jan. 24, 1969
[33] Germany
[31] P 19 03 528.0

[54] EDDY CURRENT AND-OR INDUCTION BRAKE OR CLUTCH
 10 Claims, 5 Drawing Figs.

[52] U.S. Cl. .................................................. 310/93, 310/105
[51] Int. Cl. ................................................ H02k 49/02
[50] Field of Search ........................................ 310/93, 96, 95, 105, 107–110, 210, 211, 212; 318/380

[56] References Cited
UNITED STATES PATENTS
704,574  7/1902  Pintsch .......................... 310/95 X

| 2,436,072 | 2/1948 | Matulaitis ................... | 310/105 |
| 3,020,427 | 2/1962 | Wheeler et al ............... | 310/59 |
| 3,051,858 | 8/1962 | McCown et al .............. | 310/104 |
| 3,132,270 | 5/1964 | Phelon ........................ | 310/156 |
| 3,382,384 | 5/1968 | Hulls ........................... | 310/93 |
| 3,416,016 | 12/1968 | Murakami ................... | 310/93 |

Primary Examiner—D. X. Sliney
Attorney—Meyer, Tilberry and Body

ABSTRACT: An eddy current and/or induction brake or clutch comprised of, a braking inductor and a ferromagnetic eddy current conductor arranged for relative rotation with respect to one another. The inductor includes a plurality of pole shoes of alternating magnetic polarity arranged in an annular ring and a plurality of permanent magnets disposed intermediate the pole shoes. There is further provided electromagnetic means operatively associated with the permanent magnets for regulating the magnetic field generated by the inductor.

EDDY CURRENT AND-OR INDUCTION BRAKE OR CLUTCH

This invention pertains to the brake or clutch art, and more particularly to an improved eddy current and/or induction brake or clutch.

The invention is particularly applicable to brakes or clutches for motor vehicles and will be described with particular reference thereto; however, it is to be appreciated that the invention has broader applications, such as in air or rail vehicles, electromotors and also for gear driven apparatus, such as elevators, cranes and the like.

Eddy current and/or induction brakes or clutches, which are used for braking and/or coupling rotating parts, have heretofore comprised first and second members mounted for relative rotation in spaced-apart relationship. One of the members includes a conductive member or members in which a current is induced to flow and the other member includes means for causing a varying flux field in the conductive member when the members rotate relative to each other. The conductive member is generally made of ferromagnetic material which in some instances is coated with an electrically high conductive material. The means for causing a varying flux field can either be electro or permanent magnets so arranged on the second member that alternating polarity results. When one member rotates relative to the other, the flux originating from the poles of the alternating polarity induces eddy currents in the conductive member. These eddy currents generate a counter magnetic field which produces a braking torque, the intensity of which depends upon the amount of flux and rate of rotation. The eddy currents in turn produces substantial amount of heat in the conductive member which of course must be continuously dissipated.

As heretofore discussed, prior art devices have employed either permanent magnets or electromagnets in order to produce the requisite magnetic field. Each of these magnet systems has problems associated therewith. Thus, for example, brakes or clutches which are energized electromagnetically have the disadvantage of requiring a considerable amount of electric power. This necessitates the use of high output generators which substantially increase the weight of the vehicle. Moreover, there is the additional disadvantage that whenever the current supply fails the brake or clutch is rendered inoperative, thereby creating a serious safety problem. While brakes or clutches which employ permanent magnets are not troubled by the foregoing problems, their main disadvantage resides in the area of control. Being more specific, in order to switch the brake or clutch on and off or adjust the value of the torque, it becomes necessary to displace the permanent magnets relative to ferromagnetic short circuit pieces. This displacement operation necessitates the use of complicated operating devices, such as lever transmissions, gears and the like.

The present invention contemplates a new and improved apparatus which overcomes all of the above referred problems and others and provides an eddy current and/or induction brake or clutch which may easily be controlled and requires only a minimal supply of electric power.

In accordance with the present invention there is provided an eddy current and/or induction brake or clutch comprising: a braking inductor; a ferromagnetic eddy current conductor adjacent the inductor and separated therefrom by an airgap; the inductor and conductor being arranged for relative rotation with respect to each other; the inductor having a plurality of pole shoes of alternating magnetic polarity arranged in an annular ring; a plurality of permanent magnets having a pair of opposite pole surfaces disposed intermediate the pole shoes; and electromagnetic means operatively associated with the permanent magnets for regulating the magnetic field generated by the inductor.

The principal object of the present invention is to provide an improved eddy current and/or induction brake or clutch which employs both electro and permanent magnets for generating a magnetic field.

Another object of the present invention is to provide an improved eddy current and/or induction brake or clutch which may be easily turned on and off.

An additional object of the present invention is to provide an improved eddy current and/or induction brake or clutch whose torque may be easily and accurately adjusted to the desired value.

A further object of the present invention is to provide an improved eddy current and/or induction brake or clutch which requires only a small amount of electrical power, thereby minimizing the increase in vehicle weight due to the addition of generators.

A still further object of the present invention is to provide an improved eddy current and/or induction brake or clutch which will remain operative despite a failure in the power supply.

Yet another object of the present invention is to provide an improved eddy current and/or induction brake or clutch which is simple and economical to manufacture.

These and other objects and advantages will become apparent from the following description used to illustrate the preferred embodiment of the invention when read in conjunction with the accompanying drawings in which.

Figure 1:
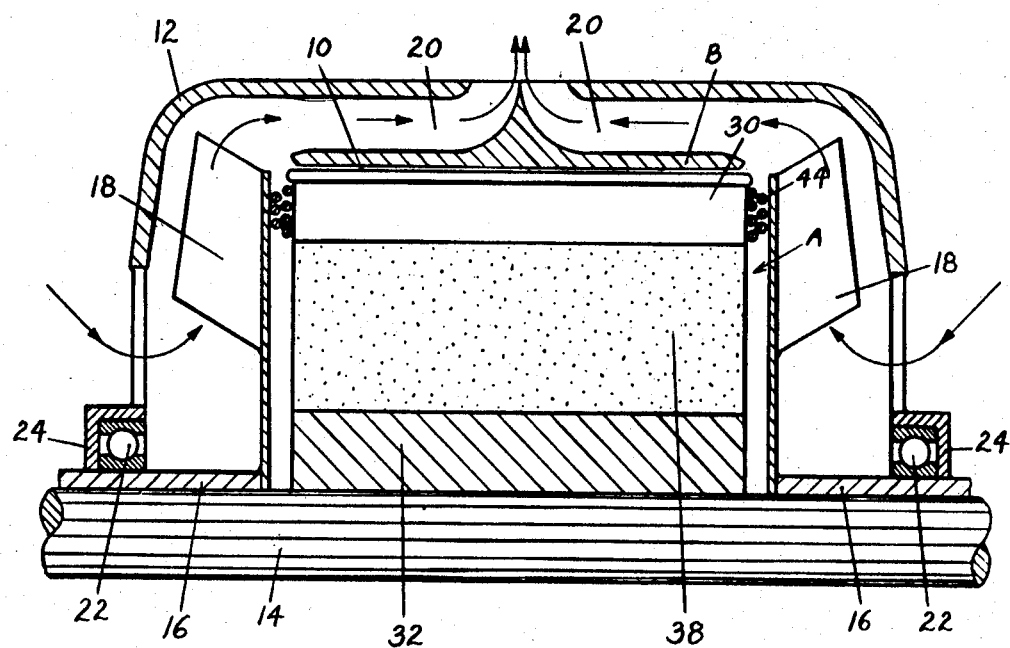
FIG. 1 is a partial cutaway view of an eddy current and/or induction brake or clutch constructed in accordance with the present invention.

Referring now to the drawings wherein the showings are for the purpose of illustrating the preferred embodiment of the invention only and not for the purpose of limiting same, FIG. 1 shows an eddy current and/or induction brake or clutch constructed in accordance with the present invention and comprising a braking inductor, designated generally by the reference letter A, and a ferromagnetic eddy current conductor B. The inductor A and conductor B are maintained in spaced-apart relationship to define an airgap 10 therebetween.

The inductor A and conductor B are surrounded by a housing 12 which is secured to a stationary part of the vehicle, such as the frame (not illustrated). The conductor B circumferentially surrounds the inductor A and is secured to the housing 12. The inductor A is mounted on a shaft 14 to be braked, such as the vehicle axle, and thereby rotates relative to the conductor B. Although the inductor A has been shown as rotating relative to the conductor B, it is to be appreciated that in other applications, to be described in more detail later, it might be desirable to have the inductor fixed and the conductor rotate with respect thereto.

Secured to the shaft 14 for rotation therewith is a mounting member 16 to which has been attached a plurality of fan blades 18. Secured to the uppermost side of the conductor B, that is the side not facing the airgap 10, are a plurality of radially extending cooling fins 20 having intermediate air channels (not illustrated). When the inductor A rotates relative to the conductor B, the blades 18 generate a stream of air which flows through the channels and past the fins 20 to cool the conductor. The housing 12 which is fixed with respect to the inductor A by securing it to a stationary portion of the vehicle is also supported on the mounting member 16 and hence the shaft 14 by means of bearings 22 which are carried in bearing casings 24.

Figure 2:
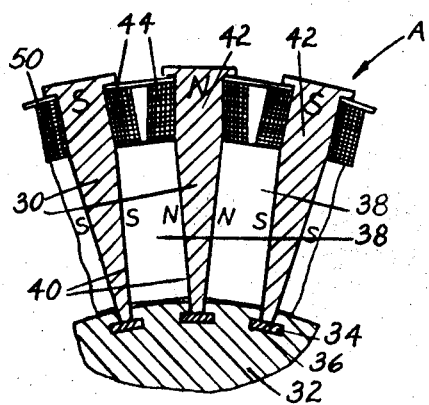
FIG. 2 is a partial cross-sectional view of the brake or clutch of FIG. 1.

Reference is now made to FIG. 2, wherein the inductor A is shown as having a plurality of radially extending pole shoes 30 arranged to define an annular ring. Although the pole shoes 30 have preferably been shown as radially extending, it is to be appreciated that they could extend axially, whereby the inductor A and conductor B would be axially adjacent one another. The pole shoes 30 are secured to a carrier member 32 which is mounted directly on the shaft 14 for rotation therewith. For fastening purposes the pole shoes 30 have been provided at their lower ends with mounting means 34, preferably of T-shaped cross section, which engage in recesses 36 of corresponding shape provided in the mounting member 32. Intermediate each of the pole shoes 30, permanent magnets 38 have been disposed to define a configuration of alternating permanent magnets and pole shoes. The magnets 38 have been magnetized in the direction of their smallest thickness and include a pair of pole surfaces 40 of opposite magnetic polarity. Each of the permanent magnets 38 have like pole surfaces in contact with a common pole shoe 30, whereby pole shoes of alternating polarity are produced. The poles of the permanent magnets 38 and the poles produced in the pole shoes 30 have been indicated in FIG. 2 by the reference letters N and S.

Each of the pole shoes 30 includes an upper end portion 42 which extends radially outward beyond the adjacent permanent magnets 38. In accordance with the present invention there is provided electromagnetic means which may take a variety of forms; however, in accordance with the preferred embodiment of the invention it takes the form of field windings 44 which are disposed on the end portions 42 of the pole shoes 30. To facilitate in securing the windings 44 on the pole shoes 30 there is provided retaining members 50 which extend circumferentially between adjoining pole shoes. The windings 44 have a direction of winding which alternates from pole shoe to pole shoe.

The magnetic field produced by the permanent magnets 38 can be increased, decreased or neutralized by the electromagnetic field produced by the field windings 44. Being more specific, the electromagnetic field produced by the field windings 44 may have a direction that increases the field produced by the permanent magnets 38 or, if the current direction is reversed, a direction which decreases or neutralizes the field produced by the permanent magnets. Thus, if the direction of the energizing field is reversed so that it opposes the magnetic field produced by the permanent magnets 38, the braking power is weakened respectively. Furthermore, if this counterfield is strong enough, the brake will be switched off. Lastly, by regulating the relationship between the field created by the permanent magnets 38 and the counterfield created by the windings 44, it is possible to easily adjust the braking torque to any desired value between the maximum and zero without the use of complicated lever transmissions, gears and the like.

In the event the power supply to the windings 44 is interrupted, thereby rendering the windings inoperative, the magnetic field produced by the permanent magnets 38 automatically becomes effective, whereby the operativeness of the brake is guaranteed. As such, the subject invention includes a built-in fail-safe device which assures that the brake will be operative despite an interruption in, or the total failure of, the supply of current to the field windings 44.

A variety of arrangements can be employed to supply current to the field windings 44 of the inductor A. Thus, for example, in a known way an AC generator can be provided, the rotor of which rotates together with the field windings. The alternating current output of this arrangement is then rectified and as direct current supplied to the field windings 44.

The braking torque of the subject invention can be adjusted in a variety of ways. For example, adjustment can be accomplished by arranging members in the energizing current circuit of the AC generator. In other applications it is desirable to adjust the value of the braking torque in accordance with the load of the vehicle. This type of automatic adjustment can be accomplished by effecting the adjustment of the energizing field of the AC generator feeding the field windings 44 through members of the vehicle which depend upon the vehicle load, for example the springs which are bent by the load.

The brake will be switched off when the magnetic field of the field windings 44 is opposed to the field produced by the permanent magnets 38 and has the same strength, whereby the induction inside the airgap 10 is zero. In order to assure an airgap induction of zero and thereby guarantee the switched off condition, means can be provided which keep the energizing current of the field windings 44 for producing the counterfield constant. These means, which can also be provided in the adjusting current circuit of the AC generator, can for example be elements which depend upon temperature. Furthermore, the AC generator should be so designed that it supplies a nearly constant voltage regardless of its rate or rotation. This can be accomplished in a known manner by employing a multipolar AC generator in order to supply alternating current of high frequency.

Figure 3:
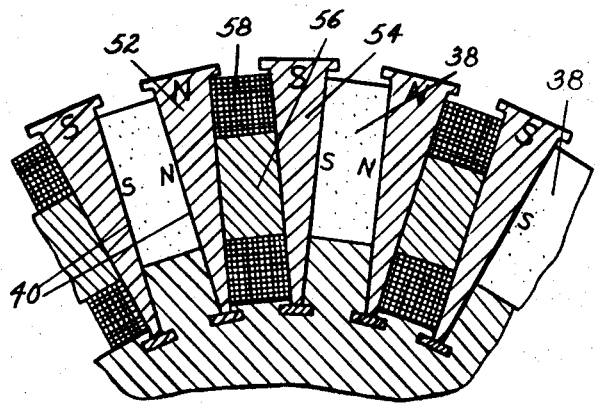
FIG. 3 is a partial cross-sectional view of another embodiment of the eddy current and/or induction brake or clutch.

Referring now to FIG. 3, wherein there is shown a modified embodiment of the inductor. In this embodiment the pole shoes are comprised of first and second segments 52, 54 respectively, which are connected by an intermediate ferromagnetic member 56. The permanent magnets 38 are disposed intermediate each of the pole shoes with opposite pole surfaces 40 in contact with the adjacent pole shoe segments 52, 54. The electromagnetic means comprises field windings 58 which are disposed on the intermediate member 56 and have a direction of winding which is the same for all pole shoes.

If the field windings 58 are not energized, the lines of magnetic force produced by the permanent magnets 38 are short-circuited through the intermediate member 56 so that the brake is in the switched off condition. When the field windings 58 are energized, the electromagnetic field produced thereby cooperates with the magnetic field produced by the permanent magnets 38 so that pole shoes of alternating polarity are created, as indicated by the reference letters N and S.

Figure 4:
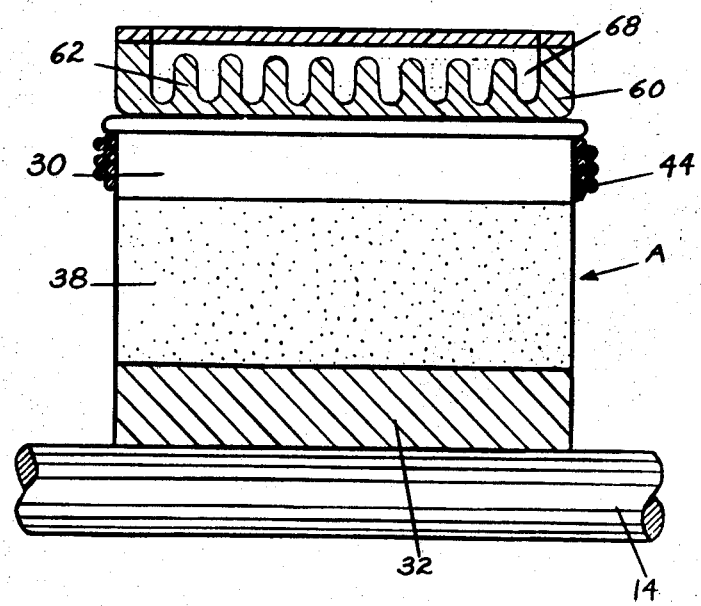
FIG. 4 is a partial cutaway view of the brake or clutch of FIG. 1 showing the use of a liquid cooling system.
Figure 5:
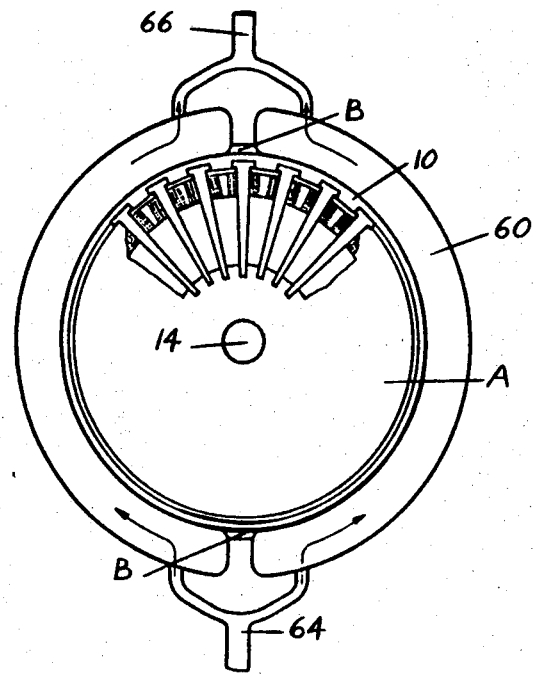
FIG. 5 is a cross-sectional view of the brake or clutch shown in FIG. 4.

Referring now to FIGS. 4 and 5, wherein the eddy current and/or induction brake or clutch is shown in conjunction with a liquid cooling system. The braking inductor A, the design of which corresponds to that shown and described in FIG. 2, is secured to the shaft 14 to be braked and is surrounded by the ring-shaped eddy current conductor B. There is provided a high pressure cooling system in operative association with the conductor B which takes the form of a cooler ring 60 that encompasses the conductor. The interior of the ring 60 is provided with cooling ribs 62 which are connected to the conductor B to facilitate in the dissipation of heat therefrom during the braking operation. The ring 60 includes an inlet 64 and an outlet 66 which permits a cooling liquid 68 to flow intermediate the ribs 62, as indicated by the arrows in FIG. 5.

It is to be appreciated that the eddy current and/or induction brake or clutch according to the present invention is not restricted in use solely to vehicles, but is also appropriate for braking electromotors, or so called braking motors. When used in vehicles, preferably the inductor A rotates and the conductor B, in order to facilitate an effective water cooling system, is stationary. However, when applied to braking motors the inductor is preferably fixed, while the conductor is fastened to the shaft of the motor to be braked and rotates therewith. When the motor is switched on, the field windings are energized at the same time so that the electromagnetic field is opposed to the permanent magnet field, whereby the effective field inside the air gap is zero. If the motor shaft is to be braked, the energizing current flowing through the field windings is reversed in order to intensify the field produced by the permanent magnets and then switched off by means of a time or centrifugal switch.

Although the invention has been described with reference to specific embodiments, variations within the scope of the following claims will be apparent to those skilled in the art.

Having thus described my invention, I claim:

1. An eddy current and/or induction brake or clutch comprising: a braking inductor; a ferromagnetic eddy current conductor adjacent said inductor and separated therefrom by an airgap; said inductor and conductor being arranged for relative rotation with respect to each other; said inductor having a plurality of pole shoes of alternating magnetic polarity arranged in an annular ring; a plurality of permanent magnets having a pair of opposite pole surfaces disposed intermediate adjacent shoes; and electromagnetic means operatively associated with said permanent magnets for selectively regulating the magnetic field generated by said inductor from a zero magnetic field in the airgap to a field greater than the permanent magnets themselves.

2. The device defined in claim 1, wherein said pole shoes and said permanent magnets are radially extending.

3. The device defined in claim 2, wherein said permanent magnets are disposed intermediate each of said pole shoes to define a configuration of alternating permanent magnets and pole shoes, each of said permanent magnets having like pole surfaces in contact with said common pole shoe, whereby pole shoes of alternating polarity are produced.

4. The device defined in claim 3, wherein said electromagnetic means comprises field windings, said pole shoes including end portions which extend radially outward beyond said permanent magnets, said windings being disposed on said end portions and having a direction of winding which alternates from pole shoe to pole shoe.

5. The device defined in claim 1 further including cooling means for dissipating the heat produced in the eddy current conductor during braking.

6. The device defined in claim 5, wherein said cooling means comprises a liquid cooling system operatively associated with said conductor.

7. The device defined in claim 5, wherein said cooling means comprises a plurality of fins arranged on said conductor and a plurality of fan blades fixed with respect to said inductor, whereby when said inductor rotates relative to said conductor said fan blades generate a stream of air which flows past said fins to cool said conductor.

8. The device defined in claim 1, wherein said permanent magnets are magnetized in the direction of their smallest thickness.

9. The device defined in claim 1, which includes a ferromagnetic member disposed intermediate every other pair of adjacent pole shoes; said permanent magnets being disposed intermediate each remaining adjacent pair of said pole shoes with opposite pole surfaces in contact with adjacent pole shoe segments, whereby pole show segments of alternating polarity are produced.

10. The device defined in claim 9, wherein said electromagnetic means comprises field windings, said winding being disposed on said intermediate member and having a direction of winding which is the same for all pole shoes.